(12) United States Patent
Lee et al.

(10) Patent No.: US 9,864,109 B2
(45) Date of Patent: Jan. 9, 2018

(54) NANOSCALE PLASMONIC FIELD-EFFECT MODULATOR

(71) Applicant: California Institute of Technology, Pasadena, CA (US)

(72) Inventors: Ho Wai Lee, Pasadena, CA (US); Stanley Burgos, San Jose, CA (US); Georgia Papadakis, Pasadena, CA (US); Harry A. Atwater, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/331,435

(22) Filed: Oct. 21, 2016

(65) Prior Publication Data

US 2017/0059894 A1   Mar. 2, 2017

Related U.S. Application Data

(63) Continuation of application No. 14/246,026, filed on Apr. 4, 2014, now Pat. No. 9,494,715.

(60) Provisional application No. 61/808,364, filed on Apr. 4, 2013.

(51) Int. Cl.
| | |
|---|---|
| *G02F 1/035* | (2006.01) |
| *G02B 5/00* | (2006.01) |
| *G02F 1/01* | (2006.01) |
| *G02B 6/122* | (2006.01) |
| *G02F 1/025* | (2006.01) |

(Continued)

(52) U.S. Cl.
CPC ........... *G02B 5/008* (2013.01); *G02B 6/1226* (2013.01); *G02F 1/011* (2013.01); *G02F 1/025* (2013.01); *G02F 1/0356* (2013.01); *B82Y 20/00* (2013.01); *G02F 2001/0151* (2013.01); *G02F 2201/12* (2013.01); *G02F 2203/10* (2013.01); *G02F 2203/15* (2013.01); *Y10S 977/932* (2013.01)

(58) Field of Classification Search
CPC ....... G02B 5/008; G02B 6/1226; G02F 1/011; G02F 1/0356; G02F 2203/10
USPC .............................. 385/2; 359/237, 238, 245
See application file for complete search history.

(56) References Cited

U.S. PATENT DOCUMENTS

| 8,349,198 B2* | 1/2013 | Araki ..................... B82Y 20/00 216/24 |
| 8,509,276 B2* | 8/2013 | Zhang .................... H01S 5/1046 372/43.01 |

(Continued)

FOREIGN PATENT DOCUMENTS

| CN | 101135749 A | 3/2008 |
| CN | 102169206 A | 8/2011 |

(Continued)

OTHER PUBLICATIONS

"Design and analysis of a phase modulator based on a metal-polymer-silicon hybrid plasmonic waveguide" by Sun et al, Applied Optics, vol. 50, No. 20, pp. 3428-3434, 2011.*

(Continued)

*Primary Examiner* — Robert Tavlykaev
(74) *Attorney, Agent, or Firm* — Foley Hoag LLP; Walter M. Egbert, III

(57) ABSTRACT

A plasmonic device having a transparent conducting oxide (TCO) waveguide and a tunable voltage applied across the TCO and a metal layer for modulating an input optical signal.

18 Claims, 12 Drawing Sheets

(51) Int. Cl.
*B82Y 20/00* (2011.01)
*G02F 1/015* (2006.01)

(56) References Cited

U.S. PATENT DOCUMENTS

| | | | | |
|---|---|---|---|---|
| 8,755,648 | B1* | 6/2014 | Sayyah | G02F 1/025 |
| | | | | 385/30 |
| 2003/0179974 | A1* | 9/2003 | Estes | B82Y 20/00 |
| | | | | 385/2 |
| 2003/0223668 | A1 | 12/2003 | Breukelaar et al. | |
| 2005/0104684 | A1* | 5/2005 | Wojcik | B82Y 20/00 |
| | | | | 333/108 |
| 2009/0273820 | A1 | 11/2009 | Dionne et al. | |
| 2010/0278474 | A1 | 11/2010 | Beausoleil et al. | |
| 2011/0069926 | A1 | 3/2011 | Mouli | |
| 2011/0215705 | A1 | 9/2011 | Long et al. | |
| 2011/0220172 | A1* | 9/2011 | Layton | G02B 5/008 |
| | | | | 136/246 |
| 2012/0170097 | A1 | 7/2012 | Han et al. | |
| 2013/0186854 | A1* | 7/2013 | Araki | G11B 5/31 |
| | | | | 216/24 |
| 2014/0224989 | A1 | 8/2014 | Long et al. | |

FOREIGN PATENT DOCUMENTS

| | | |
|---|---|---|
| JP | 2004279078 A | 10/2004 |
| WO | 2011/162719 A1 | 12/2011 |

OTHER PUBLICATIONS

Berini et al., "Long-range surface plasmon-polariton waveguides and devices in lithium niobate," Journal of Applied Optics, 101: 112114-1 through 112114-12 (2007).
Bozhevolnyi et al., "Scaling for gap plasmon based waveguides," Opt Express, 16(4): 2676-2684 (2008).
Feigenbaum et al., "Unity-Order Index Change in Transparent Conducting Oxides at Visible Frequencies," Nano Lett, 10: 2111-2116.
International Preliminary Report on Patentability (IPRP) dated Oct. 15, 2015 issued in the corresponding International Application PCT/US2014/033104, 10 pages.
International Search Report and Written Opinion for International Application No. PCT/US2014/033104, dated Aug. 12, 2014, 15 pages.
Krasavin et al., "Photonic processing on electronic scales: electro-optic field-effect nanoplasmonic modulator," Phys Rev Lett, 109: 053901-1 through 053901-5 (Aug. 2012).
Lee et al., "Dispersion characteristics of channel plasmon polariton waveguides with step-trench-type grooves," Opt Express, 15(25): 16596-16603 (2007).
Lu et al., "Ultracompact electroabsroption modulators based on tunable epsilon-near-zero-slot waveguides," IEEE Photonics Journal, 4(3): 735-740 (Jun. 2012).
Matsuzaki et al., "Characteristics of gap plasmon waveguide with stub structures," Opt Express, 16(21): 16314-16325 (2008).
Melikyan et al., "Surface plasmon polariton absorption modulator," Opt Express, 19(9): 8855-8869 (Apr. 2011).
Nikolajsen et al., "In-line extinction modulator based on long-ranged surface plasmon polaritons," Opt Commun, 244: 455-459 (2005).
Sorger et al., "Ultra-compact silicon nanophotonic modulator with broadband response," Nanophotonics, 1(1): 17-22 (May 2012).
Takizawa, "Electro-optic cutoff modulator using a Ti-indifussed LiNbO3 channel waveguide with asymmetric strip waveguides," Opt Lett, 11(12): 818-820 (1986).
Wen et al., "Experimental cross-polarization detection of coupling far-field light to highly confined plasmonic gap modes via nanoantennas," Appl Phys Lett 98, 101109 (2011), pp. 101109-1-101109-3.
Melikyan, et al., "Surface plasmon polariton absorption modulator references and links simulation study of surface-plasmon-resonance electro-optic light modulator based on a polymer grating coupler 9 / Optiocs Express 8855," Opt Express, 8855-8869 (2011).
Zhu, et al., "Ultracompact Si electro-optic modulator based on horizontal Cu-insulator-Si-insulator-Cu nanoplasmonic waveguide," Optical Fiber Communication Conference and Exposition/National Fiber Optic Engineers Conference, 1-3 (2013).
Thomas, et al., "Plasmonic enhanced electro-optic stub modulator on a SOI platform," Photonics and Nanostructures, 9(1): 101-107 (2011).
Supplementary European Search Reported dated Nov. 23, 2016 for EP 14778727.9.

* cited by examiner

NANOSCALE PLASMONIC FIELD-EFFECT MODULATOR

CROSS REFERENCE TO RELATED APPLICATION

The present application is a Continuation Application of U.S. patent application Ser. No. 14/246,026 filed Apr. 4, 2014 which claims priority to U.S. Provisional Patent Application No. 61/808,364 filed on Apr. 4, 2013, each of which is incorporated herein by reference in its entirety.

STATEMENT REGARDING FEDERALLY SPONSORED RESEARCH OR DEVELOPMENT

This invention was made with government support under FA9550-12-1-0024 awarded by the Air Force. The government has certain rights in the invention.

FIELD

The present invention relates to plasmonic waveguide modulators. More particularly, it relates to nanoscale plasmonic field-effect modulators.

BACKGROUND

Optical modulators are used in a variety of applications, for example, in computer networks. One example of an optical modulator is a photonic optical modulator where the optical signal propagates inside the bulk of the propagating material.

SUMMARY

A plasmonic field-effect modulator based on a transparent conducting oxide (TCO) active region is described. The TCO material is used together with plasmonic waveguides to provide plasmonic waveguide modulators with high dynamic range and low waveguide loss.

According to a first aspect, an optical modulator is described, comprising: a substrate; a metal layer on the substrate, the metal layer having a grooved channel; a dielectric layer on the metal layer and in the grooved channel; a transparent conducting oxide (TCO) on the dielectric layer and in the grooved channel; and a tunable voltage applied across the TCO and the metal layer.

The grooved channel comprises a first end of the grooved channel at a first edge of the metal layer, and a second end of the grooved channel at a second edge of the metal layer.

An optical input signal is configured to be applied to the grooved channel at the first end, and a modulated optical signal is configured to be outputted at the second end.

The grooved channel forms a plasmonic waveguide such that an input optical signal applied to the first end of the grooved channel is output from the second end of the grooved channel.

The grooved channel comprises a stub extending substantially perpendicularly to the grooved channel.

The grooved channel comprises a section having a first width and a section having a second width, wherein the width of the groove varies gradually from the first width to the second width, and from the second width to the first width.

According to a second aspect, a plasmonic waveguide modulator is described, comprising: a first accumulation layer formed by a first metal-dielectric interface; a second accumulation layer formed by a second metal-dielectric interface, the first accumulation layer and the second accumulation layer being arranged next to and spaced from each other, and such that a dielectric layer of the first interface and a dielectric layer of the second interface face each other; transparent conducting oxide (TCO) between the first accumulation layer and the second accumulation layer; and a tunable voltage applied across the TCO and a metal layer of the first interface and the second interface.

The TCO is configured to propagate an input optical signal by confining the input optical signal in the grooved channel.

The grooved channel comprises a first section having a first width and a second section having a second width.

The first accumulation layer comprises a first stub extending in a direction away from the second accumulation layer.

The first stub forms a cavity resonator along a plasmonic optical propagation path formed by the first interface, the second interface and the TCO.

According to a third aspect, a method for modulating an optical signal is described, the method comprising: receiving, with a plasmonic waveguide, an input optical signal, the plasmonic waveguide comprising: a metal layer on a substrate, the metal layer having a grooved channel, a dielectric layer on the metal layer and in the grooved channel, and a transparent conducting oxide (TCO) on the dielectric layer and in the grooved channel; applying a tunable voltage across the TCO and the metal layer; and turning on and/or turning off the tunable voltage, thus cutting off and/or transmitting the optical signal in the grooved channel.

Transmitting the optical signal comprises propagating the optical signal in a plasmonic gap mode, such that the propagating optical signal is confined within the grooved channel.

The turning on and/or turning off the tunable voltages comprises iteratively turning on and/or turning off the tunable voltage at a set frequency.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components.

DETAILED DESCRIPTION

Figure 1:
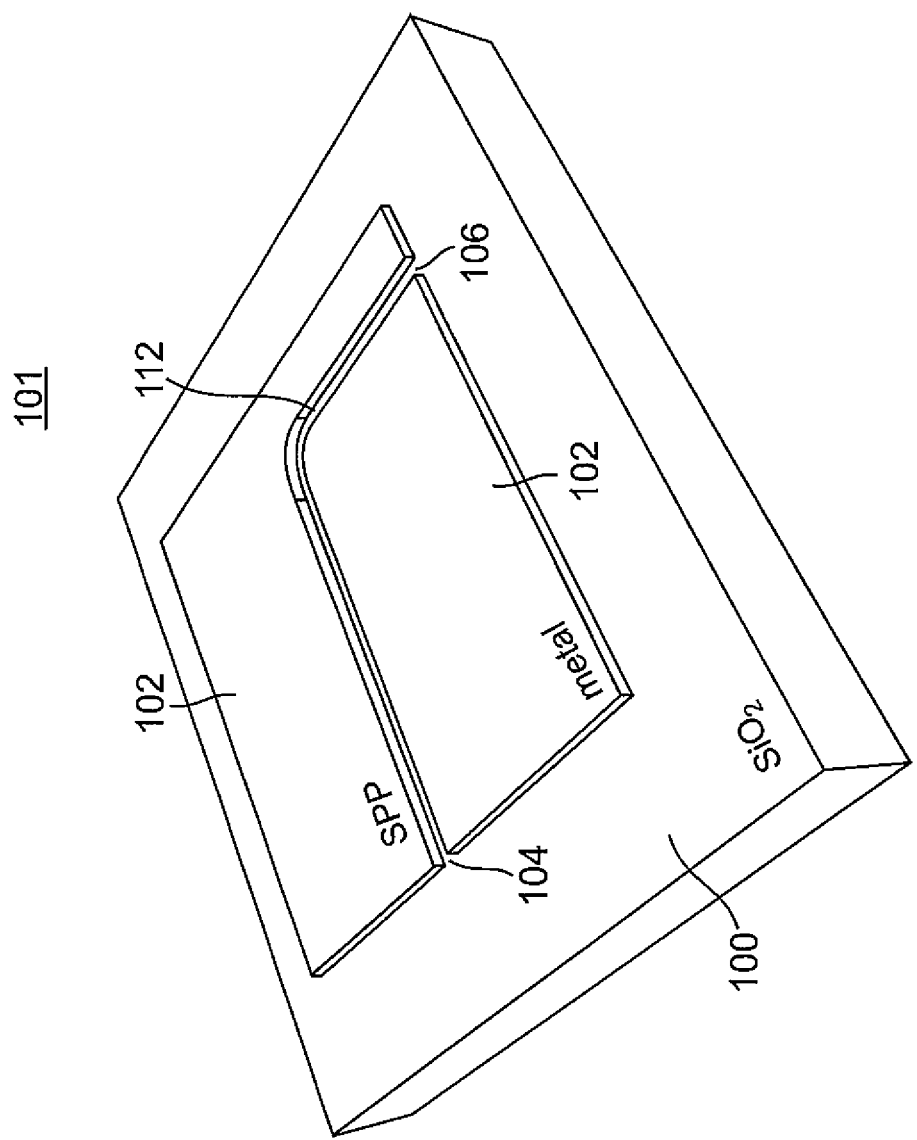
FIG. 1 is a perspective view of a portion of a nanoscale plasmonic waveguide modulator according to an embodiment.

The present invention will now be described more fully with reference to the accompanying drawings, in which example embodiments thereof are shown. While the described embodiments of the invention may be modified in various ways, the described embodiments are presented as examples in the drawings and in the detailed description below. The intention of the disclosure, however, is not to limit the invention to the particular embodiments described. To the contrary, the invention is intended to cover all modifications, equivalents, and alternatives falling within the scope of the invention as defined by the appended claims. Moreover, detailed descriptions related to well-known functions or configurations have been omitted in order not to unnecessarily obscure the subject matter of the present invention.

The sizes of the layers and regions in the drawings may be exaggerated for convenience of explanation. Like reference numerals refer to like elements throughout. It will be understood that when a layer, region, or component is referred to as being "on", "formed on", "over", or "formed over", another layer, region, or component, it can be directly or indirectly on or formed on the other layer, region, or component. That is, for example, intervening layers, regions, or components may be present.

Active control of light at the nanoscale level with plasmonic waveguides has a variety of applications in photonic chip integration. Transparent conducting oxides (TCOs) have high transmission at optical wavelengths and therefore, are desirable for integration into active plasmonic structures. TCO can be used together with plasmonic waveguides to provide plasmonic waveguide modulators with high dynamic range (~2 dB/μm) and low waveguide loss (~0.4 dB/μm). Carrier concentrations of TCOs can be significantly altered via application of electrical bias, similar to the field-effect of MOS-devices where an accumulation layer is formed due to the applied electric field, subsequently inducing a change in the local index of refraction. When the TCO is arranged in a TCO/dielectric/metal configuration, an electrical bias can be applied to the TCO and the metal to achieve a plasmonic waveguide modulator as a result of an accumulation layer formed due to the field-effect from the bias, similar to the field-effect in a metal oxide semiconductor field-effect transistor (MOSFET). Because of the high modal confinement achievable in plasmonic waveguides, TCO based waveguides can cause large changes to the effective index of plasmonic modes through the field-effect mechanism, thus offering high speed, power efficient modulators with low insertion losses.

According to an embodiment of the invention, a plasmonic waveguide is created by forming a grooved channel (a gap) in a metal layer, and filling the grooved channel with TCO. FIG. 1 illustrates a perspective view of a thin (e.g., ~200 nm) metal layer 102 formed on a semiconductor substrate 100. A gap is formed in the metal layer 102, thus creating a grooved channel 112 that extends from a first edge of the metal layer 102 to a second edge of the metal layer 102. In some embodiments, the gap may be, but is not necessarily limited to, approximately 200-300 nm. However, in some embodiments, the gap may be as narrow as 10 nm, or as wide as 1,000 nm. In some embodiments, the grooved channel 112 is a substantially straight grooved channel 112, extending directly across from the first edge of the metal layer 102 to an opposite edge of the metal layer. In other embodiments, the grooved channel 112 is curved or bent as shown in FIG. 1. A curved or bent grooved channel 112 may reduce the amount of scattering of the input optical signal by a cross-polarization detection scheme, thus improving signal-to-noise ratio detection in the output signal. For purposes of this disclosure, the embodiments will be described with respect to a grooved channel 112 having a 90 degree bend by way of example, and is not intended to be limiting. A person skilled in the art will realize that the grooved channel 112 may take different paths, straight or curved, based on factors such as shape, size, and/or application of the plasmonic waveguide 101.

In some embodiments, the grooved channel 112 is not necessarily limited to square grooves having a bottom wall and two sidewalls, as shown in the embodiment of FIG. 1. Instead, the grooved channel may be, for example, a V-shaped grooved channel.

Figure 2:
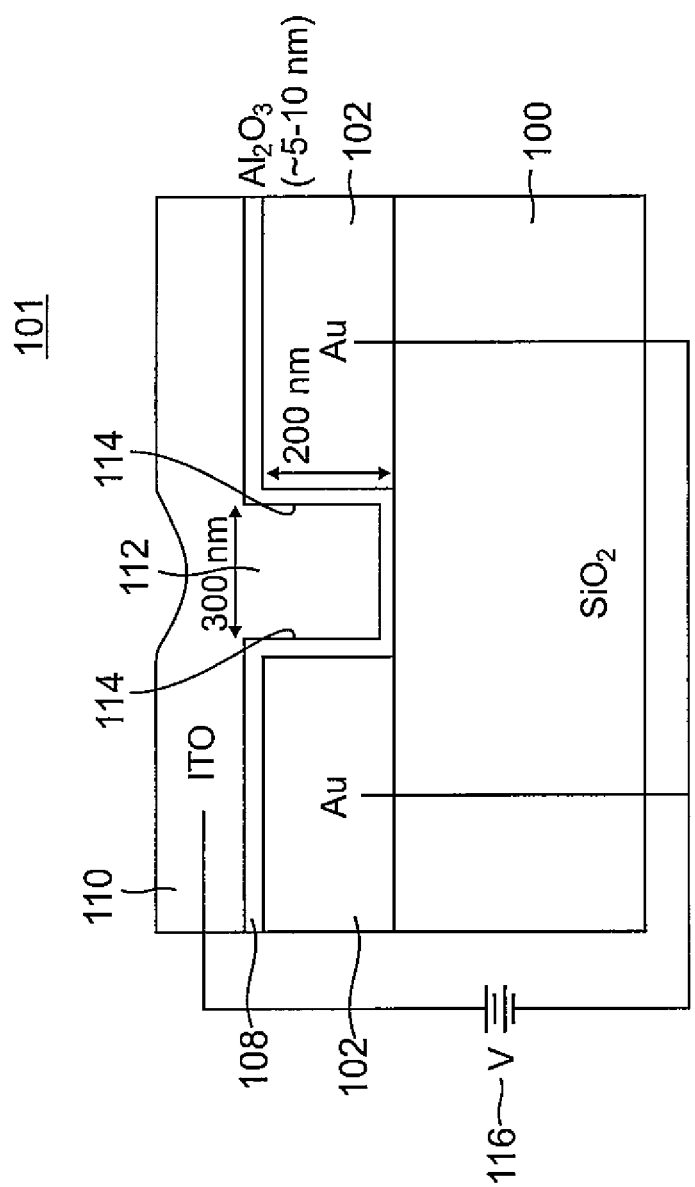
FIG. 2 is a cross-sectional view of the nanoscale plasmonic waveguide modulator according to an embodiment.

FIG. 2 is a cross-sectional view of the plasmonic waveguide 101 of FIG. 1, according to an embodiment of the invention. The gap created by the metal layer 102 exposes a portion of the substrate 100 below the metal layer 102. A dielectric layer 108 is formed on the metal layer 102, and in the grooved channel 112, thus covering the exposed portion of the substrate 100 and the sidewalls 114 of the metal layer 102 formed as a result of the gap. Therefore, the plasmonic waveguide 101 is arranged in a semiconductor/metal/dielectric/TCO layer configuration. More specifically, in one embodiment, it is a silicon dioxide/gold/aluminum dioxide/indium tin oxide (ITO) layer configuration. The section inside the grooved channel 112 is arranged in a semiconductor/dielectric/TCO configuration because the metal layer 102 is removed from the grooved channel 112. In some embodiments, the dielectric layer 108 is about 5-10 nm, and the thickness of the dielectric layer 108 is substantially the same along the sidewalls 114, the bottom of the grooved channel 112 and on the metal layer 102. However, in some embodiments, the dielectric layer 108 may even be as thin as 1 nm, or as thick as 200 nm. The dielectric layer 108 serves as an insulator between the metal layer 102 and the TCO 110 so that current does not pass through the dielectric layer 108 (insulator) and a voltage difference is established between the metal layer 102 and the TCO 110. By way of example, the metal layer 102 may be gold, silver, or aluminum, or a combination thereof, but not necessarily limited to these metals. By way of example, the dielectric layer 108 can be aluminum dioxide, silicon dioxide, or other insulators.

In some embodiments, the gap created by the metal layer 102 may not necessarily expose a portion of the substrate 100. Instead, the grooved channel in the metal layer may have a metal bottom wall. That is, a groove is formed in the metal layer 102, but the groove does not completely reach the substrate layer. Thus, according to this embodiment, the dielectric layer within the grooved channel is also formed on the metal layer, and the TCO is formed on the dielectric layer, similar to the other regions of the plasmonic waveguide.

According to an embodiment of the invention, a TCO layer 110 is formed on the dielectric layer 108, completely covering the grooved channel 112. Thus, the TCO layer 110 is about 300 nm thick above the dielectric layer 108, and the grooved channel 112 portion is completely covered with the TCO layer 110. Therefore, the TCO layer 110 in the region over the grooved channel 112 is thicker than the TCO layer 110 in the region over the metal layer 102. However, the TCO contacts all portions of the dielectric layer 108, including the sidewall 114 portions of the grooved channel 112. The thickness of the TCO layer 110 can be made thicker or thinner according to the application for which the plasmonic waveguide is being used. For example, in some embodiments, the TCO layer 110 may be thicker to increase confinement of the optical signal, or vice versa. In some embodiments, the TCO layer 110 may be as thin as 50 nm, or as thick as 1,000 nm. By way of example, the TCO 110 can be indium tin oxide (ITO), or gallium zinc oxide (Ga:ZnO), aluminium zinc oxide (Al:ZnO) or other transparent conductive oxides. While the embodiment shown in FIG. 2 shows a dip or a depressed portion of the TCO layer 110 over the grooved channel 112, the dip is not necessary. Instead, the dip may be formed merely due to a sputtering from fabrication process of the plasmonic waveguide 101.

Figure 3:
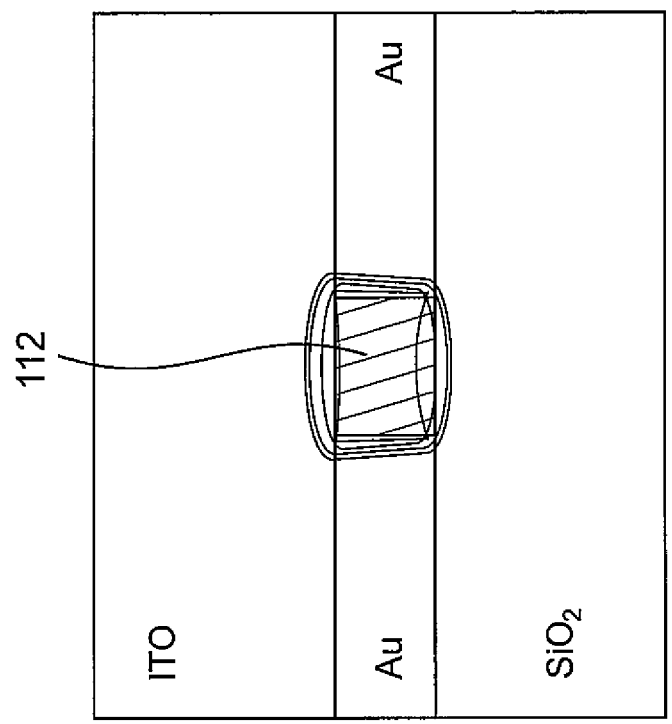
FIG. 3 is a graphical representation of carrier densities in the various layers of material of the nanoscale plasmonic waveguide modulator.

FIG. 3 illustrates a field distribution in the plasmonic waveguide 101 of FIGS. 1-2, according to the described embodiment. The field distribution shows that the optical signal is confined within the grooved channel 112, with minimal scattering in the surrounding areas. An input optical signal is confined within the grooved channel 112 and propagates in plasmonic mode from an input 104 of the plasmonic waveguide 101 to an output 106 of the plasmonic waveguide 101 (see FIG. 1). That is, the input optical signal coupled to the input 104 via, for example, an optical coupling device (e.g., optical fiber, optical antenna, etc.), and the surface plasmon polariton (SPP) of the input optical signal propagates inside the grooved channel 112. Generally, in plasmonic mode, SPP travels along the metal/dielectric interface. However, when two metal/dielectric interfaces are positioned facing each other with a gap therebetween, the two interfaces create the grooved channel 112 described herein, and operate in a "gap" plasmonic mode where the input optical signal propagates inside the grooved channel 112 instead of at the interface of the metal/dielectric layer. Accordingly, in some embodiments, the optical signal can propagate for a longer distance in the gap plasmonic mode with two interfaces when compared with the general plasmonic mode having one interface.

According to an embodiment of the invention, an electrical bias voltage is applied by a voltage source 116 across the TCO layer 110 and the metal layer 102. Thus, when the bias is applied, an accumulation layer is formed at the metal/dielectric interface (e.g., $Al_2O_3$/ITO interface) that subsequently changes the properties of the propagation mode in the grooved channel 112. That is, when the bias is applied across the TCO layer 110 and the metal layer 102, the carrier concentration of the TCO is changed such that the input optical signal is cutoff, or nearly cutoff, and the total transmission is reduced such that the optical signal is substantially non-detectable at the output of the plasmonic device 101. This state corresponds to an OFF state if the plasmonic waveguide device is used, for example, as a switch. In some embodiments, the input optical signal can be cutoff by about 30 dB (i.e., an extinction ratio of about 30 dB or more). Therefore, the plasmonic waveguide can behave as an optical switch by merely turning ON/OFF the electrical bias voltage, and rapidly cycling or modulating the bias voltage establishes a plasmonic waveguide modulator.

Figure 4:
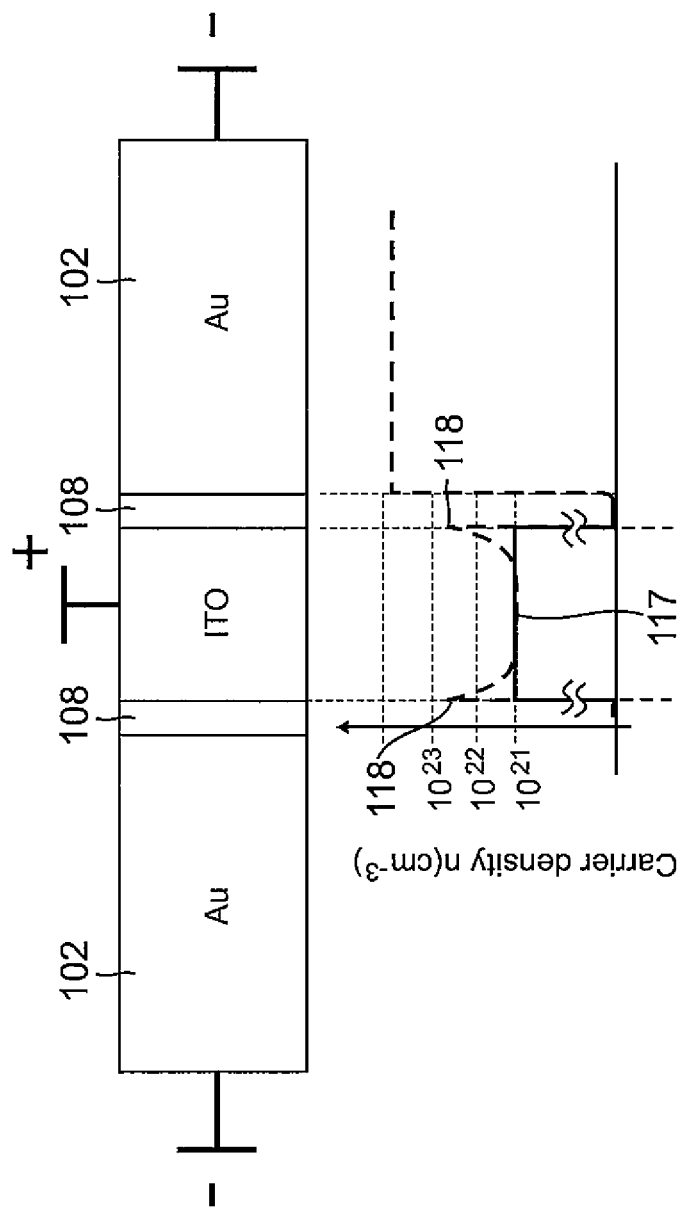
FIG. 4 is a diagram showing a plasmonic mode field distribution for the nanoscale plasmonic waveguide modulator according to an embodiment.

FIG. 4 is a graphical representation of carrier densities in the TCO layer 110, the dielectric layer 108, and the metal layer 102, of the plasmonic waveguide modulator according to an embodiment of the invention. In this embodiment, a positive bias is applied to the TCO layer 110 and a negative bias is applied to the metal layer 102. As recognized by a person skilled in the art, the carrier density of the metal layer 102 (e.g., gold) is relatively high, and the carrier density of the dielectric layer 108 is relatively low. While the carrier density of the TCO layer 110 near the center (i.e., away from the adjacent dielectric layers 108) is shown to be approximately $10^{21}$ cm$^{-3}$ 117, the carrier densities of the TCO layer 110 adjacent the dielectric layers 108 (i.e., at the TCO/dielectric interface) is much higher as seen at 118. That is, the carrier density of the accumulation layer formed as a result of the electrical bias, has carrier concentrations higher than the remaining areas of the TCO layer. Therefore, the electrical bias voltage can be increased or decreased to vary the carrier densities at the interface, thus changing the amount of the input optical signal to propagate in the grooved channel 112.

Figure 5A:
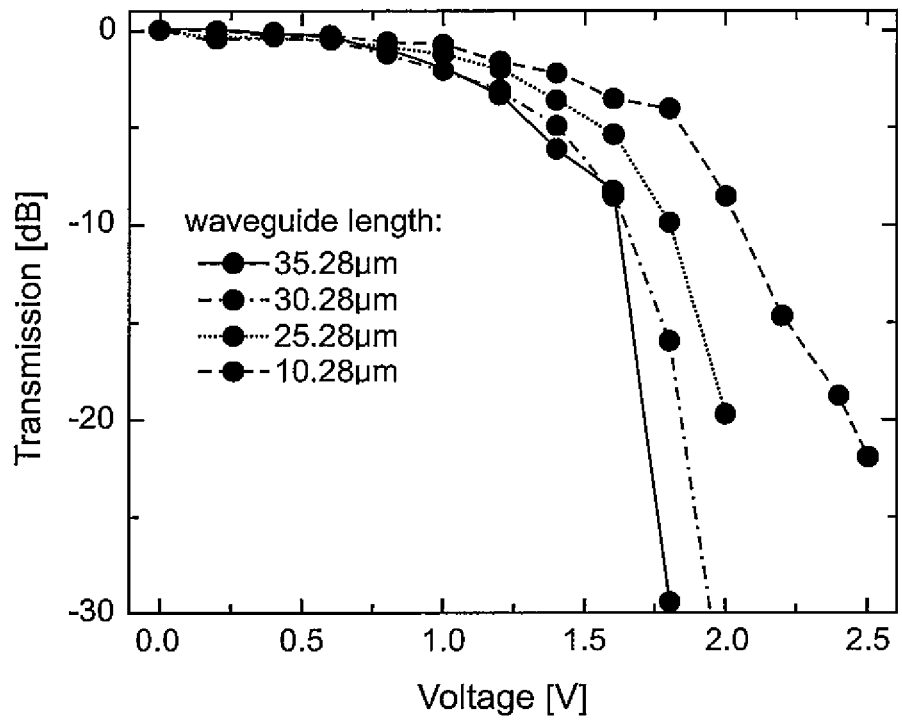
FIGS. 5A-5B are graphical representations of transmission or measured loss of an optical input signal for various bias voltages.

FIG. 5A is a graphical representation of the input optical signal transmission through the grooved channel 112 of the plasmonic waveguide 101 as a function of different bias voltages. While this graphical representation shows these effects for voltages in the range of 0-2.5 V, other voltage ranges such as, for example, 0-5 V are possible. For example, if the applied bias voltage is higher than a breakdown voltage of the dielectric material comprising the dielectric layer 108, then the dielectric material may become damaged. Therefore, in some embodiments, the maximum bias voltage is determined based on the thickness of the dielectric layer 108. By way of example, a 3 V bias voltage may applied for a dielectric layer 108 (oxide layer) of 5 nm. However, the voltage may be slightly higher or lower depending on the type of dielectric layer. According to the embodiment, the transmission strength decreases as the bias voltages increases. In some embodiments, the size of the waveguide affects transmission of the optical signal through the plasmonic waveguide 101. For example, longer lengths of the grooved channel 112 result in greater loss of the propagating optical signal. Accordingly, FIG. 5A shows the transmission results for four exemplary lengths of the waveguide. For example, transmission for a plasmonic waveguide with the longest length, 35.28 μm (out of the four exemplary waveguide lengths), has a lower transmission at a given bias voltage when compared with the transmission for a plasmonic waveguide with shorter lengths. For example, when a voltage of approximately 1.8V is applied to the plasmonic waveguide, the transmission for the longest waveguide (35.28 μm) decreases significantly, while in the case of the shorter waveguide (10.28 μm), the transmission level is relatively high. That is, with a bias of about 1.8 V, the optical signal in the 35.28 μm plasmonic waveguide is nearly cutoff (−30 dB), whereas the optical signal in the 10.28 pm plasmonic waveguide is still transmitted (−2 dB).

Figure 5B:
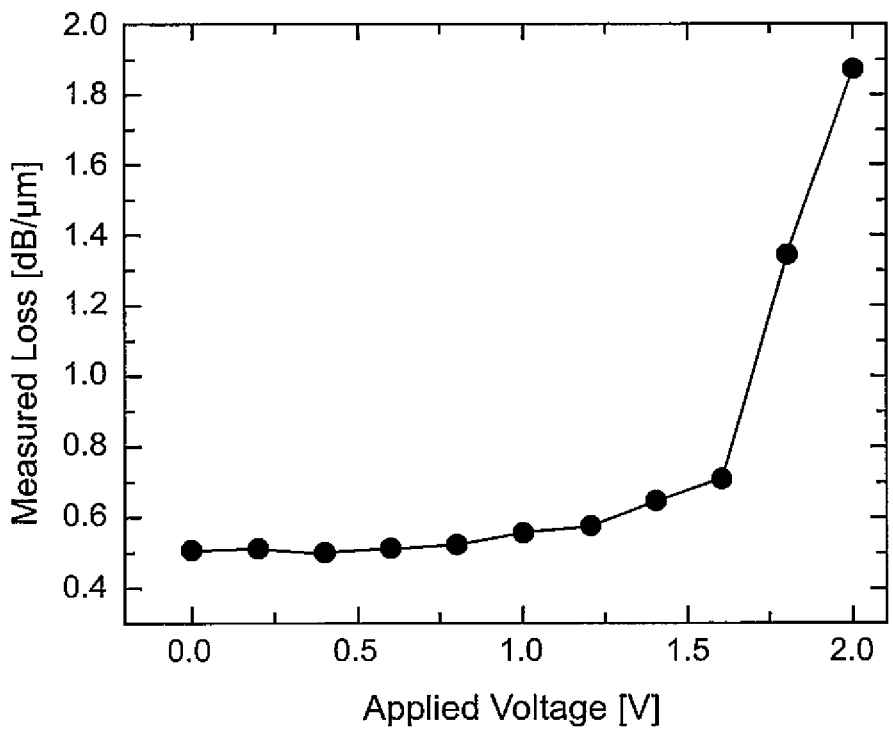

FIG. 5B shows the optical signal loss for every micrometer of the plasmonic propagation in the plasmonic waveguide at different bias voltages. In one embodiment, the loss is relatively constant (0.5-0.7 dB/μm) for bias voltages of about 0 V to about 1.5 V, but the loss increases significantly more for bias voltages greater than about 1.5 V. For example, the loss when a 2 V bias voltage is applied is about 2 dB/μm. Therefore, the bias voltage can be cycled between a relatively smaller voltage (a voltage that allows more transmission) and a relatively larger voltage (a voltage that causes more loss) to create a plasmonic waveguide based optical modulator, according to the various embodiments of the invention. For example, a plasmonic waveguide can be a 50 GHz optical modulator when the bias voltage is cycled at a frequency of 50 GHz, The bias voltages and the optical signal transmission and loss shown in FIGS. 5A-5B are provided as exemplary embodiments, and are not intended to necessarily be limited to these parameters.

Figure 6:
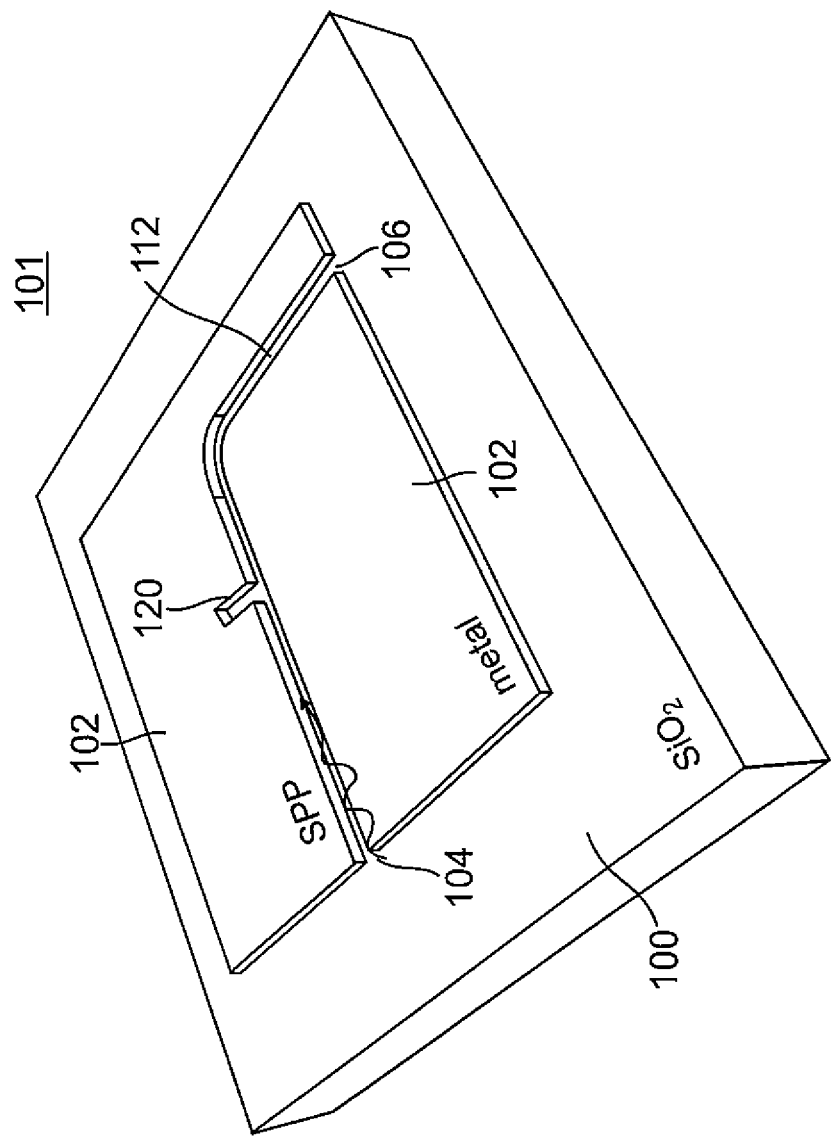
FIG. 6 is a perspective view of a portion of a nanoscale plasmonic waveguide modulator according to an embodiment.

One quality of a desirable optical switch in some applications is a high extinction ratio (or modulation strength) to have a distinguishing ON state and an OFF state. Another quality may be an optical switch that has minimum scattering of the optical signal, which reduces insertion losses. To further enhance the modulation strength and reduce the operation voltage to minimize power consumption for modulation, a cavity resonator can be established in the grooved channel 112 of the plasmonic waveguide by forming a further indentation in the gap of the grooved channel. This indentation is be referred to herein as a stub. FIG. 6 shows a perspective view of a plasmonic waveguide with a stub 120 formed near the center of the grooved channel 112.

Figure 7:
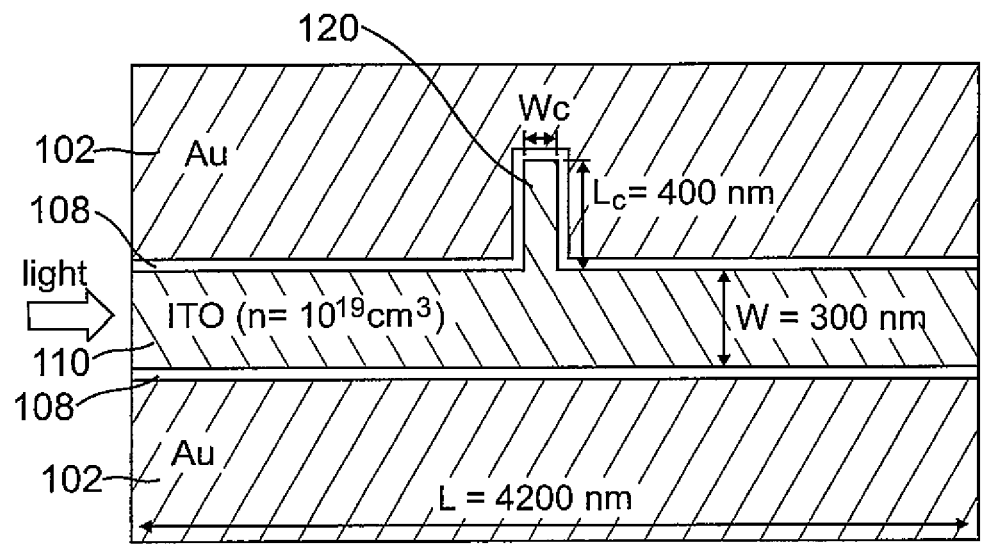
FIG. 7 is a cross-sectional view of the nanoscale plasmonic waveguide modulator according to an embodiment.
Figure 8:
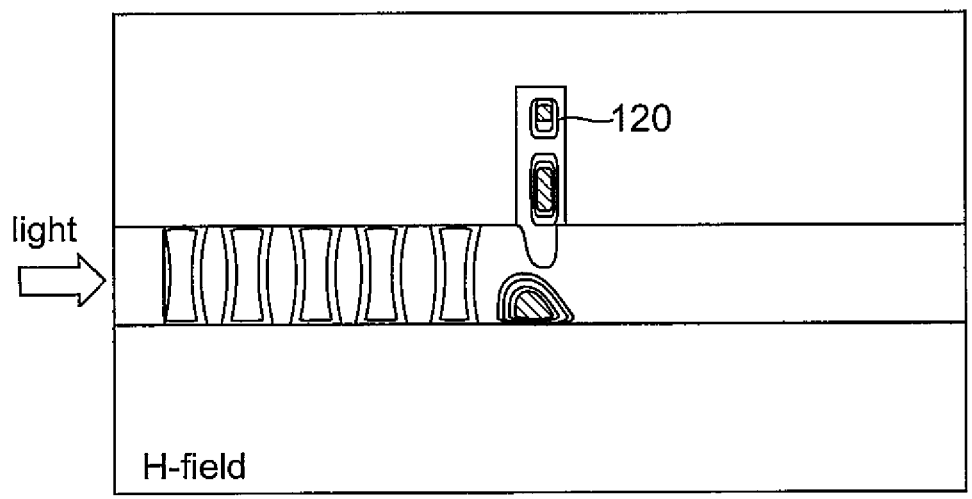
FIG. 8 is a diagram showing a plasmonic mode field distribution for the nanoscale plasmonic waveguide modulator according to an embodiment.

FIG. 7 is a cross-sectional top-view of the plasmonic waveguide modulator according to an embodiment of the invention. According to the embodiment, the stub 120 is formed along the inside of the grooved channel 112, and extends into one side of the metal layer 102. That is, the stub 120 is a further gap in the metal layer 102, and is covered with the dielectric layer 108, and filled with TCO, similar to the rest of the grooved channel 112. A localized Fabry-Perot resonance is formed in and around the region of the cavity as shown in the magnetic field diagram of FIG. 8. The formation of the stub allows the light to resonate near the region of the stub 120, thus improving confinement of the optical signal. Since it is desirable in some embodiments to reduce scattering of the optical signal near the input 104 and output 106, the stub 120 may be placed near the center of the grooved channel 112 (away from the input 104 and the output 106 ends of the grooved channel 112).

In some embodiments, the plasmonic waveguide is tunable to set resonant wavelengths. The carrier concentration at the accumulation layer region can be changed by varying the electrical bias such that the waveguide substantially cuts off the optical signal at different resonant wavelengths. According to an exemplary embodiment, for a 5 nm accumulation layer with a carrier concentration of $1\times10^{19}$ cm$^{-3}$, the resonant wavelength of the plasmonic waveguide is 1630 nm, while for a carrier concentration $2.5\times10^{20}$ cm$^{-3}$, the resonant wavelength is 1580 nm. Therefore, by varying the bias voltage to vary the carrier concentration, the plasmonic waveguide can be tuned according to a desired resonant wavelength based on the application of the plasmonic waveguide device.

Figure 9:
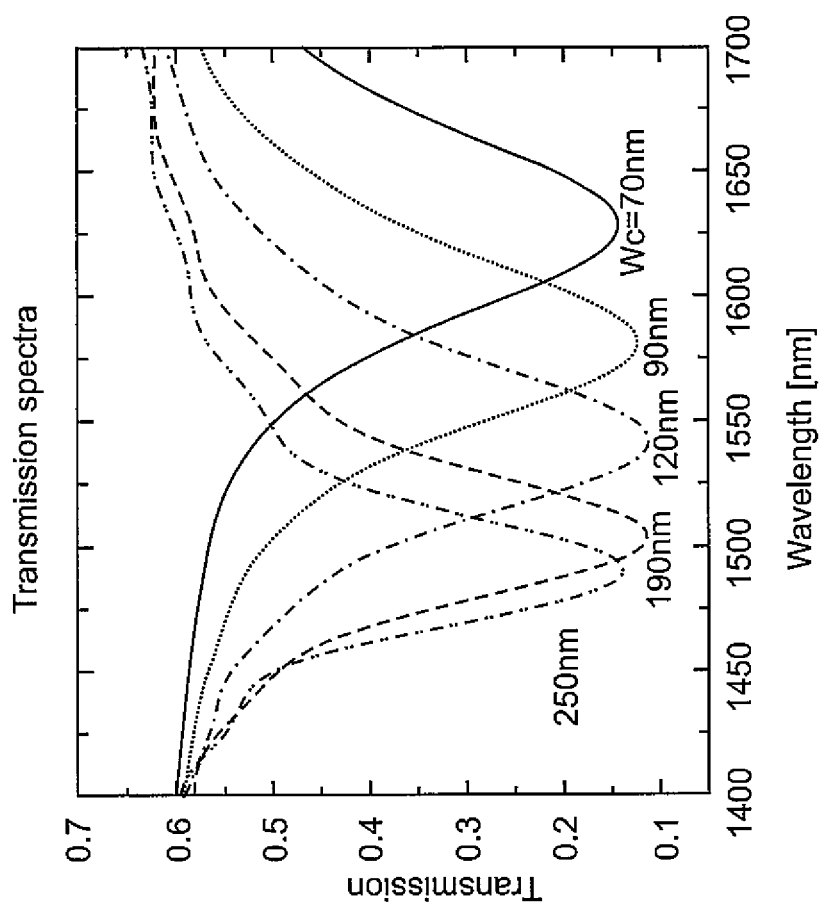
FIG. 9 is a graphical representation of plasmonic transmission spectra at various wavelengths for various stub sizes according to an embodiment.

In the embodiment shown in FIG. 7, the stub 120 has a length $L_c$ of 400 nm and a width $W_c$ of 70 nm for a plasmonic waveguide having a grooved channel width W (i.e., gap width) of 300 nm. However, the stub 120 can have other dimensions in order to tune the plasmonic waveguide to have a desired resonant wavelength. Accordingly, FIG. 9 shows an exemplary comparison of the various resonant wavelengths for varying stub 120 widths $W_c$, ranging from 70 nm to 250 nm. Smaller widths provide higher resonant wavelengths, while larger widths $W_c$ provide lower resonant wavelengths. However, the dimensions are not limited thereto, and may even range from as low as 10 nm to as high as 500 nm. In some embodiments, the stub can have different shapes, as long as the resonant cavity is created in the grooved channel, and is not necessarily limited to the shape shown herein. For example, the stub may be trapezoidal or ellipsoidal.

Figure 10:
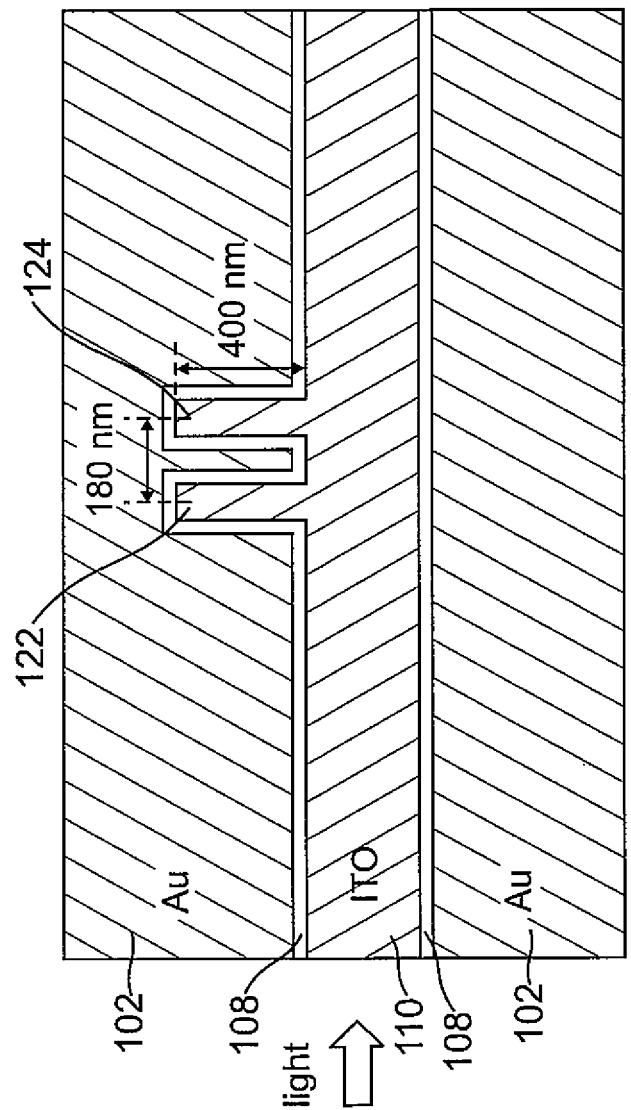
FIG. 10 is a cross-sectional view of the nanoscale plasmonic waveguide modulator according to an embodiment.
Figure 11:
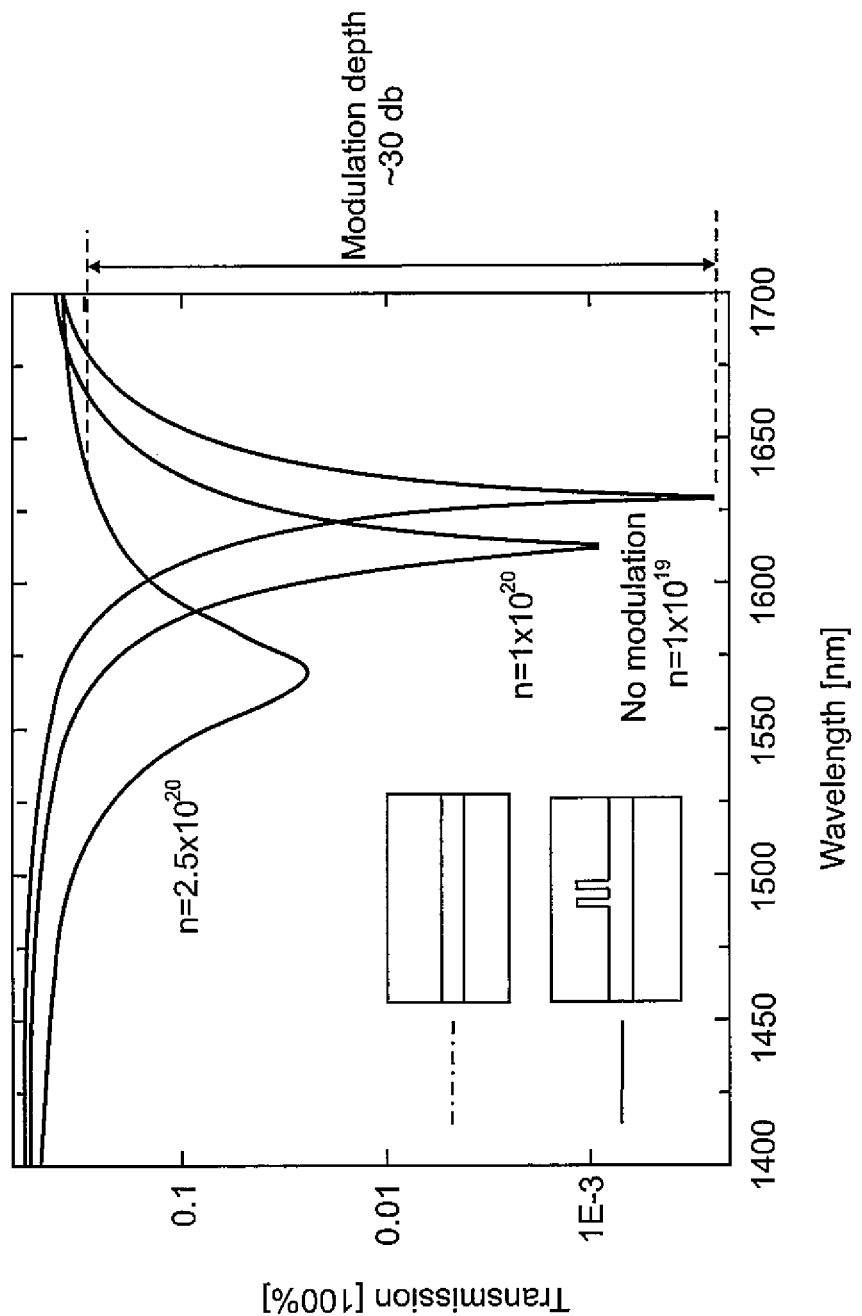
FIG. 11 is a graphical representation of transmission in the nanoscale plasmonic waveguide modulator according to an embodiment.

According to another embodiment, the plasmonic waveguide modulator can have two stubs (a first stub 122 and a second stub 124) formed along the inside of the grooved channel 112, as shown in FIG. 10. The double stub embodiment improves confinement of the optical signal, which increases the modulation strength. For example, according to the exemplary embodiment of FIG. 10 where each of the two stubs have a length $L_c$ of 400 nm and a width $W_c$ of 70 nm, and a distance of 180 nm from the center of the first stub 122 to the center of the second stub 124, the modulation strength is about 30.4 dB for a wavelength of λ=1630 nm as shown in FIG. 11, thus greatly improving the resonance based modulation efficiency. Accordingly, an optical modulator having a bandwidth of greater than 100 GHz and a switching energy of less than 5 fJ/bit can be achieved in a micro-length plasmonic modulator. While the modulator having one or two stubs is described, modulators with more than two stubs can also be created. The spacing between the stubs is another factor that can be considered when tuning the modulator to the desired, optimal resonant wavelength.

Figure 12:
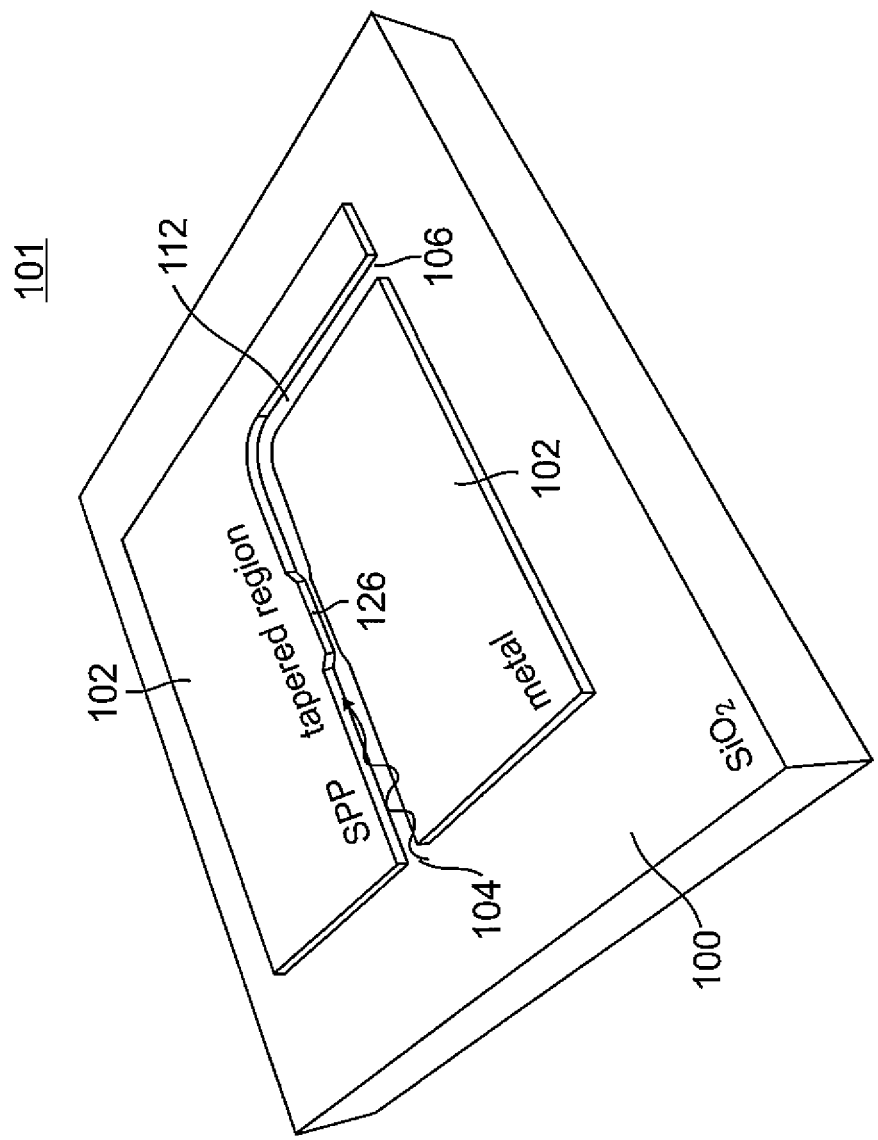
FIG. 12 is a perspective view of a portion of a nanoscale plasmonic waveguide modulator according to an embodiment.

FIG. 12 is a perspective view of the plasmonic waveguide modulator according to another embodiment of the invention. According to this embodiment, instead of providing a stub 120 along the grooved channel 112 as in the embodiment of FIG. 6, a portion of the grooved channel 112 has an adiabatically tapered region 126, which increases the modulation strength of the plasmonic waveguide modulator.

Figure 13:
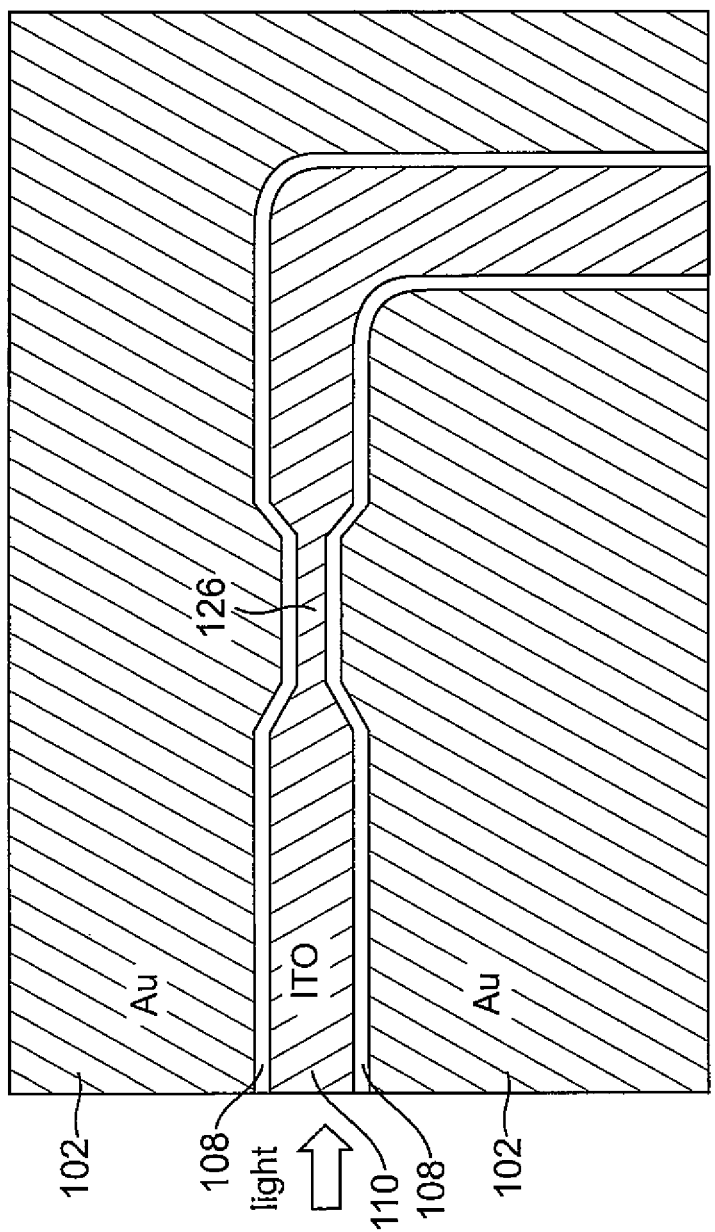
FIG. 13 is a cross-sectional view of the nanoscale plasmonic waveguide modulator according to an embodiment.

FIG. 13 is a cross-sectional top-view of the plasmonic waveguide of FIG. 12. The tapered region 126 is shown as a section of the grooved channel 112 that has a narrower width W relative to the remaining portion of the grooved channel 112. The region between the wider portion of the grooved channel and the narrower portion of the grooved channel is tapered. In some embodiments, the wider region of the grooved channel is approximately 300 nm, as described in the other embodiments, and width of the tapered region 126 is approximately 120 nm. The tapered region 126 is approximately 5 μm long. According to the embodiment, a longer tapered region results in a stronger modulation strength, and a higher propagation loss. A shorter tapered region results in weaker modulation strength, and less propagation loss. Additionally, a wider channel of the tapered region 126 provides less confinement of the optical signal, and thus results in weaker modulation strength. A narrower channel of the tapered region 126 provides greater confinement of the optical signal, and thus results in greater modulation strength.

As described according to the various embodiment of the invention, a plasmonic waveguide can modulate the input optical signal by switching ON/OFF the waveguide by modulating the bias voltage. By way of example, the bias voltage can be provided by an off-the-shelf voltage source or voltage modulator.

Accordingly, the plasmonic waveguide modulator can be made ultra-compact when compared in size to, for example, a photonic waveguide modulator. While the optical signal propagates inside the bulk of the material in a photonic waveguide, in the case of a plasmonic waveguide, the optical waves propagate as SPP along the surface, or at the interface of the metal/dielectric layers. Thus, the size of the plasmonic waveguide can be reduced since the optical waves are not contained inside the bulk of a material. Rather, they are confined to an interface between two materials. For example, the plasmonic waveguide modulator may be as small as 300 nm or less. Therefore, the plasmonic waveguide modulator, described according to the embodiments, take up less space and consume less power, yet still provide faster modulation of about 100 GHz or more based on the embodiments of the described invention.

In some embodiments, the plasmonic waveguide modulator can be fabricated with electron beam lithography on silica, with about 200 nm metal layer such as gold layer with a waveguide gap width W of about 300 nm. In some embodiments, the metal layer 102 may be as thin as 50 nm, or as thick as 1,000 nm. A layer (5-10 nm) of aluminum oxide is deposited for isolation and a TCO such as ITO is sputtered on top as an active plasmonic material, with the gold and ITO layers serving as the bias voltage contacts (see FIG. 2) for the modulator. A 2.5 dB extinction ratio modulation can be achieved with an applied bias of, for example, 5 V for a 100 nm wide, 1 µm long waveguide structure where the unmodulated, unbiased ITO carrier concentration is n $1\times10^{19}$ cm$^{-3}$. However, the parameters described above provide one example embodiment and a method for manufacturing the same, and is not intended to limit other parameters from the scope of the invention. Moreover, modifying one or more of the described parameters allows a person skilled in the art to precisely tune a desired plasmonic waveguide modulator that is optimal for the intended application.

Table 1 shows an example comparison between the plasmonic waveguide modulator according to the described embodiments (rows 8-9) and other devices (rows 1-7). See, for example, A. Joushaghani, et al., Appl. Phys. Lett. 102, 061101 (2013); V. J. Sorger et al., Nanophotonics 1, 17 (2012); J. A. Dionne et al., Nano Lett. 9, 897 (2009); S. Randhawa et al., Opt. Express 20, 2354 (2012); S. Papaioannou et al., Sci. Rep. 2, 652 (2012); M. R. Watts et al., Opt. Express 19, 21989 (2011); J. Liu et al., Nat. Photonics 2, 433 (2008), the contents of which are incorporated herein by reference in their entirety.

describe the presented embodiments and is not intended to limit the scope of the present invention.

As used herein, the singular forms "a", "an", and "the" are intended to include the plural forms as well, unless the context clearly indicates otherwise. It will be further understood that the terms "comprises" and/or "comprising", as used herein, specify the presence of the stated features or components, but do not preclude the presence or addition of one or more other features or components. "/", as used herein may be interpreted as "and", or may be interpreted as "or" depending on the situation.

It will be recognized by those skilled in the art that various modifications may be made to the illustrated and other embodiments of the invention described above, without departing from the broad inventive step thereof. Therefore, the invention is not limited to the particular embodiments or arrangements disclosed, but is rather intended to cover any changes, adaptations or modifications which are within the scope and spirit of the invention as defined by the appended claims and their equivalents.

What is claimed is:

1. An optical modulator, comprising:
   a substrate;
   a metal layer on the substrate, the metal layer having a grooved channel;
   a dielectric layer on the metal layer and in the grooved channel; and
   a transparent conducting oxide (TCO) on the dielectric layer and in the grooved channel, wherein the optical modulator is controlled by an electrical bias voltage applied to the TCO and to the metal layer, and
   wherein a plasmonic waveguide is modulated in the grooved channel due to a field effect from the electrical bias voltage applied to the TCO and the metal layer, and an input optical signal propagates inside the grooved channel; and
   wherein the TCO is insulated from the metal layer by the dielectric layer.

2. The optical modulator of claim 1, wherein the grooved channel comprises a stub extending substantially perpendicularly to the grooved channel.

TABLE 1

| Device Type | Modulation Mechanism | Length (µm) | Extinction Ratio (dB) | Extinction Ratio/Length (dB/µm) | Insertion Loss (dB) | Voltage (V) | Bandwidth (nm) |
|---|---|---|---|---|---|---|---|
| 1 Hybrid SPP-VO2 waveguide | VO2 phase transistion | 7 | 16.4 | 23 | 6 | 0.4 | >100 |
| 2 Hybrid SPP-ITO waveguide | ITO plasma dispersion | 5 | 5 | 1 | 1 | 4.4 | >100 |
| 3 Field-effect MIM waveguide | Si plasma dispersion | 2.2 | 4.6 | — | 4 | 0.8 | >100 |
| 4 Dielectric loaded SPP ring resonator | Electro-optic polymer | 35 | 0.7 | 0.02 | — | 32 | 10 |
| 5 DLSPP Mach-Zehnder interferometer | Thermo-optic polymer | 60 | 14 | 0.23 | 11 | 0.33 | — |
| 6 Si double microdisk | Si plasma dispersion | 12.5 | 16 | 1.3 | 4 | 0.6 | 0.4 |
| 7 GeSi electroabsorption | Franz-Keldysh effect | 50 | 10 | 0.5 | 6 | 0.05 | 1.4 |
| 8 Straight plasmon waveguide | ITO field-effect | 10 | >30 | >2 | 4 | 2 | >100 |
| 9 Stub resonant waveguide | ITO field-effect | <1 | >30 | >30 | <0.7 | | |

Although the terms "first", "second", etc. may be used herein to describe various components, these components should not be limited by these terms. These descriptors are used only to distinguish one component from another. The terminology in this application is used to more clearly 3. The optical modulator of claim 2, wherein the stub is formed near a center section of a length of the grooved channel.

4. The optical modulator of claim 2, wherein the stub forms a cavity resonator in the grooved channel.

5. The optical modulator of claim 2, wherein the stub comprises two or more stubs, each of the stubs being spaced from one another.

6. An optical modulator, comprising:
a substrate;
a metal layer on the substrate, the metal layer having a grooved channel;
a dielectric layer on the metal layer and in the grooved channel; and
a transparent conducting oxide (TCO) on the dielectric layer and in the grooved channel, wherein the optical modulator is controlled by an electrical bias voltage applied to the TCO and to the metal layer, and
wherein a plasmonic waveguide is modulated in the grooved channel due to a field effect from the electrical bias voltage applied to the TCO and the metal layer, and an input optical signal propagates inside the grooved channel; and
wherein the optical modulator includes a first metal-dielectric interface and a second metal-dielectric interface, the first and the second metal-dielectric interfaces are positioned facing each other and defining a gap comprising TCO therebetween, and the input optical signal propagates in a gap plasmonic mode within the gap defined between the first and the second metal-dielectric interfaces.

7. The optical modulator of claim 6, wherein the gap is disposed within the grooved channel.

8. The optical modulator of claim 6, wherein a first electrical bias applied to the TCO is different from a second electrical bias applied to the metal layer.

9. The optical modulator of claim 6, wherein the grooved channel comprises a first end of the grooved channel at a first edge of the metal layer, and a second end of the grooved channel at a second edge of the metal layer.

10. The optical modulator of claim 9, wherein the optical input signal is configured to be applied to the grooved channel at the first end, and a modulated optical signal is configured to be outputted at the second end.

11. The optical modulator of claim 9, wherein the optical signal applied to the first end of the grooved channel is output from the second end of the grooved channel.

12. The optical modulator of claim 6, wherein an entire portion of the grooved channel is covered with the TCO.

13. The optical modulator of claim 6, wherein the grooved channel comprises a section having a first width and a section having a second width, wherein the width of the groove varies gradually from the first width to the second width, and from the second width to the first width.

14. The optical modulator of claim 13, wherein the first width is wider than the second width.

15. The optical modulator of claim 6, wherein the grooved channel is V-shaped.

16. The optical modulator of claim 6, wherein the TCO is selected from the group consisting of: indium tin oxide (ITO), gallium zinc oxide (Ga:ZnO), and aluminum zinc oxide (Al:ZnO).

17. The optical modulator of claim 6, wherein the metal layer is a gold layer or a silver layer.

18. The optical modulator of claim 6, wherein the grooved channel in the metal layer extends to the substrate.

* * * * *